United States Patent [19]

Hersey, Jr.

[11] 4,053,937
[45] Oct. 11, 1977

[54] CALIBRATION TIMING BANDS

[75] Inventor: William Hugh Hersey, Jr., Cypress, Calif.

[73] Assignee: Mohawk Data Sciences Corporation, Herkimer, N.Y.

[21] Appl. No.: 656,505

[22] Filed: Feb. 9, 1976

[51] Int. Cl.² .................... G11B 21/10; G04F 8/00
[52] U.S. Cl. ................................... 360/77; 324/183
[58] Field of Search ................ 360/77; 324/181, 183, 324/88

[56] References Cited

U.S. PATENT DOCUMENTS 3,742,470  6/1973  Ha et al. ............................. 360/77
3,840,893  10/1974  Jacoby et al. ....................... 360/77

Primary Examiner—Daryl W. Cook
Attorney, Agent, or Firm—Robert R. Hubbard

[57] ABSTRACT

A method of preparing an alignment disc pak in which first and second signals of different frequencies $f1$ and $f2$ are recorded in eccentric bands at a selected track on the disc such that the playback signal will consist of three components having frequencies $f1$, $f2$ and $(f1-f2)$. One frame of the playback signal is first displayed with one beam of a multibeam oscilloscope on the display surface thereof such that the $(f1-f2)$ signal component appears as a "cat's eye" pattern. The delay time base time marker is then employed to measure the time base of one of the cat's time marker is further employed to produce first and second narrow timing bands on either side of the intermediate crossover of the cat's eye pattern by erasing the recorded signals on the disc only in those radial sectors of the disc corresponding in position to two positons of the time marker on the scope as defined by the formula (Gc - Sp/2 ± 0.2.

2 Claims, 2 Drawing Figures

CALIBRATION TIMING BANDS

BACKGROUND OF THE INVENTION

A. Field of Invention

This invention relates to the magnetic recording art and in particular to a novel and improved method for preparing an alignment disc pak.

Disc paks generally comprise one or more magnetic discs upon which digital information can be recorded and played back by means of a disc drive which includes motive means for rotating the disc, an arm which carries transducers for recording and playing back the information and associated electronics. Information is recorded on the disc in concentric tracks with a typical track density of 100 or 200 tracks per inch dependent upon the disc drive application. The transducer arm is indexable to any one of the recording tracks, there being 202 tracks in one typical disc used in a number of commercial disc drives. Many computer installations include several disc drives to provide additional memory to the internal memory of a central processing unit. It is absolutely essential in such installations that a disc pak recorded on any one of the disc drives be capable of record and/or playback operation on any of the other disc drives without error. This requirement dictates that the transducer arms of all the disc drives be in alignment with one another within certain tolerance limits. Al alignment disc pak is used to accomplish this alignment of the transducer arms of a number of disc drives.

B. Prior Art

Prior Art alignment disc paks have been prepared by recording periodic signals of different frequencies $f1$ and $f2$ either in adjacent tracks or in adjacent bands which straddle one of the tracks. Although these signals could be recorded at any one of the tracks, they have been typically recorded at track no 73, where track numbering begins with zero for the outermost track and proceeds inwardly to tract no. 202 for the track nearest the geometric center of the disc. These signals are recorded on the disc with an eccentric spindle, i.e., a spindle that is offset from the normal geometric center by a small distance (typically on the order of 0.0015 in.). when such a disc is played back on a disc drive with a normal or noneccentric spindle, the transducers will pick up the signal of frequency $f1$ for a portion of a disc revolution and the signal of frequency $f2$ for the remainder of the disc revolution due to the eccentricity of the band in which the signals are recorded. This playback signal includes signal components of frequency $f1$ and $f2$ and also a further signal component of frequency $(f1-f2)$, where $f1$ is greater than $f2$. When the playback signal is displayed on an oscilloscope, the $(f1-f2)$ signal component appears as an envelope in a horizontal figure eight pattern, commonly called a "cat's eye" pattern, i.e., one having two outer crossovers and an intermediate crossover.

To align the transducer arm of a disc drive with the alignment disc pak, the transducer arm is indexed to track 73 (or to whichever track the aligmment signals are recorded) and the playback signal is coupled to an oscilloscope to display the cat's eye pattern. If there is equal horizontal distance (time base) between the intermediate crossover and each of the outer crossovers, the transducer arm is in alignment, meaning that the transducer picks up each recorded signal for substantially one-half of a disc revolution. If the horizontal distance between the intermediate crossover and the outer crossover are unequal, the transducer arm is manually adjusted until they are so equal. As this equality comparison is a visual process, equality can be achieved only within tolerance limits and, of course, varies from one human observer to another. The problem is compounded because the envelope appears as a rather thick bright trace consisting of a series of short, closely spaced, vertical lines on a background of a lighter trace of the other two signal components. This makes it extremely difficult to visually observe time base equality of the cat's eye lobes, particularly in disc drive applications requiring a track density of 200 tracks per inch.

BRIEF SUMMARY OF THE INVENTION

By the method of this invention an alignment disc pak is prepared in which two vertical, narrow, spaced apart timing bands appear on the cat's eye pattern such that a disc drive transducer is aligned by centering the intermediate crossover between the two timing bands. In the method according to the invention, the cat's eye pattern of a disc with signals of different frequencies $f1$ and $f2$ recorded in eccentric and adjacent bands is displayed with one beam of a multi-beam oscilloscope on the display surface thereof. The distance Sp between the intermediate crossover and one of the outer crossover is then measured. An elongated time marker is then produced on the display surface with another of the oscilloscope beams. The intensified area is then positioned to first one and then the other of two locations on either side of the intermediate crossover, the two positions being defined by the formula $(Gc - Sp \pm 0.2/2)$, Gc being the geometric center of a displayed frame of the play back signal. First and second narrow timing bands are then produced on either side of the intermediate crossover by erasing the recorded signals only in radial sectors of the disc corresponding in position to the two positions of the time marker and to the width of such marker.

DESCRIPTION OF PREFERRED EMBODIMENT

Figure 1:
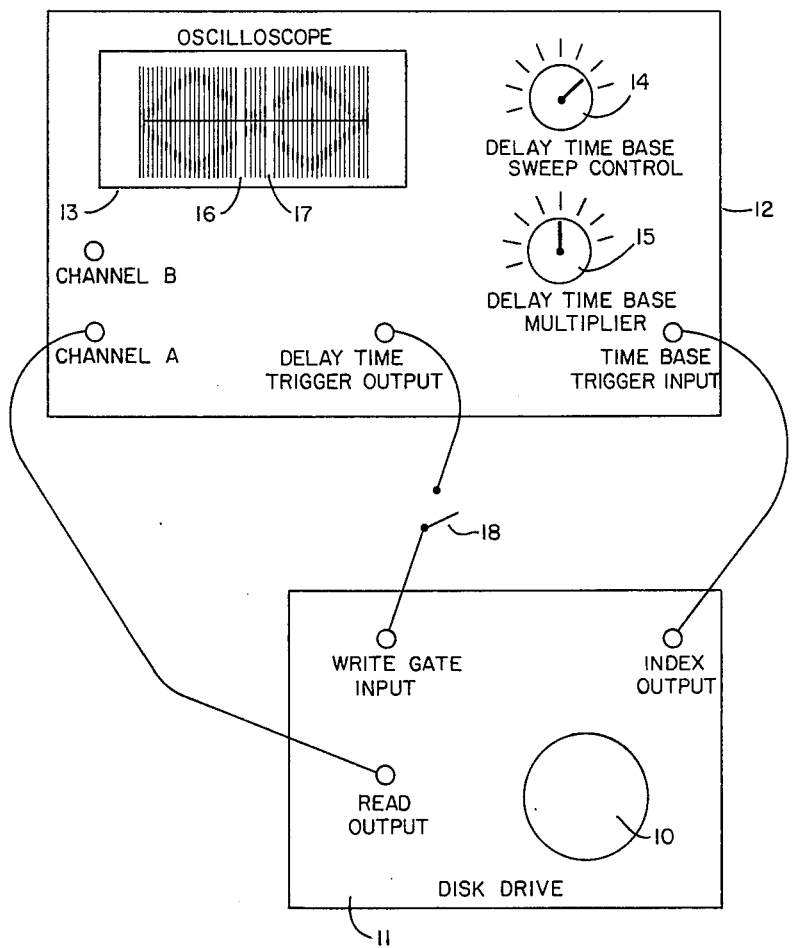
FIG. 1 is a plan view showing the equipment and the electrical connections employed in the practice of the method embodying this invention.

Referring now to FIG. 1, the method of the present invention employs an alignment disc pak 10, a disc drive 11 and a multi-beam oscilloscope 12. The alignment disc pak 10 is assumed to already have recorded thereon two signals of frequency $f1$ and $f2$ (with $f1 > f2$) in adjacent eccentric bands as described heretofore. The two signals are recorded at a selected track which for the purpose of the present description is assumed to be track no. 73. Typically, the frequency $f1$ is 2.5197 megahertz; $f2$ is 2.5 megahertz and the difference or beat frequency $(f1 - f2)$ is 19.7 kilohertz.

In the first step of the method embodying the invention, one frame of the playback signal for track 73 is displayed on the oscilloscope display surface 13. To accomplish this the playback signal is coupled from the read output of the disc drive to one of the channel inputs of the oscilloscope, herein illustrated as channel A, by way of example. The disc drive index signal is coupled via the disc drive index output to the time base trigger input of the oscilloscope. As is known, the index signal is essentially a pulse marker occurring once per disc revolution to signify a reference or starting point for recording information on the disc. The oscilloscope 12 is then calibrated in the usual manner as per its operating instructions to display a single frame of the playback signal by means of control knobs not shown in FIG. 1.

In the next step of the method, another beam of the oscilloscope is used to generate on the display surface a time marker. For oscilloscopes having a delayed time base capability, such capability is used to generate the marker. To this end, a delay time base sweep control knob 14 is employd to establish the time base or horizontal width of the marker. It has been found that the time marker width should preferably be on the order of one-half the time width of one period of the beat frequency ($f1-f2$). For the aforementioned frequency values, the time marker width turns out to be approximately 100 microseconds.

Figure 2:
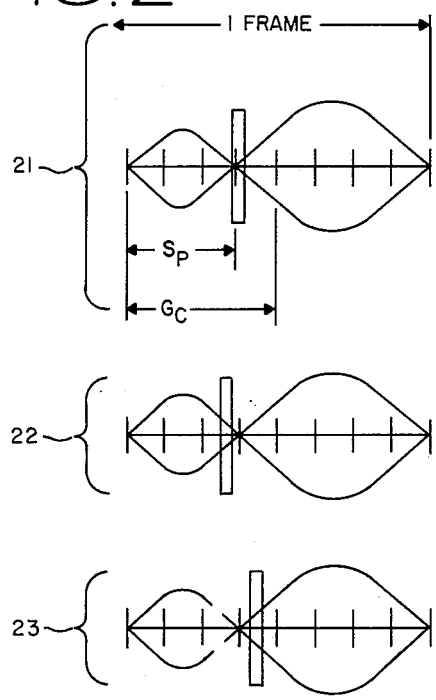
FIG. 2 shows three oscilloscope traces which occur at various stages in the method embodying the invention.

In the next step of the method, the distance Sp between the intermediate crossover and one of the two outer crossover of the cat's eye pattern displayed on the scope is measured. With reference to FIG. 2, oscilloscope trace 21 illustrates a typical cat's eye pattern and shows the relationship between the distance Sp and the geometrical center of Gc of the oscilloscope trace. In the oscilloscope traces of FIG. 2 which are merely illustrations of the cat's eye pattern at different stages in the method of this invention, the horizontal time base of the two cat's eye lobes are shown to be unequal, signifying that the transducer arm of the disc drive 11 is not in perfect alignment. As will appear hereinafter, it is unnecessary that the transducer arms of the disc drive 11 be in alignment.

In order to accomplish the step of measuring Sp, the time marker is positioned with the delay time base multiplier control knob 15 of the oscilloscope 12 to the position shown in oscilloscope trace 21 in FIG. 2 where it straddles the intermediate crossover point of the cat's eye pattern. The distance Sp is then read directly from the dial 15 which in many oscilloscopes includes a numeric readout indicative of the horizontal time position of the marker.

The Sp distance is then compared to the geometric center Gc by means of the formula (Gc − Sp ± 0.2/2), to determine the exact location on the oscilloscope trace of the timing bands. The Gc distance or value can be determined either by visual observation of the oscilloscope trace relative to the grid pattern on the display surface 13 or by positioning the time marker with the delay time base multiplier control 15 to the geometric center of the trace and obtaining a numeric readout.

In the next two steps of the invention, the time marker is positioned first to one and then the other of the two locations defined by the above formula and illustrated in traces 22 and 23 of FIG. 2 by means of turning the delay time base multiplier control knob 15 to the numeric value indicative of such locations. While at the location illustrated in trace 22, a timing band is produced on the disc pak 10 by closure of a switch 18 in a lead coupling the delay time trigger output of the oscilloscope 12 to the write gate input of the disc drive 11. The delay time trigger is a pulse which occurs once per display frame (once per disc revolution) having a time position corresponding to the position of the time marker in trace 22 and a pulse width corresponding to such marker. This pulse then serves to erase the recorded signals $f1$ and $f2$ in a radial sector of the disc corresponding in position to the position of the time marker shown in trace 22 and to the width of the marker. This corresponds to the narrow timing band 16 shown on the display surface 13 in FIG. 1.

When the time marker is subsequently moved to the other side of the intermediate crossover as in trace 23 of FIG. 2, the switch 18 is again closed to erase the recorded signals $f1$ and $f2$ in a narrow radial sector of the disc corresponding in position and width to the time marker of trace 23. This corresponds to the narrow timing band 17 shown on display surface 13 in FIG. 1.

One multi-beam oscilloscope which has been used in the practice of this invention is the model 453 oscilloscope available from Tektronics Inc., Portland, Oregon. This oscilloscope advantageously has a delay time base capability. It is to be noted, however, that multi-beam oscilloscopes which do not have delay time base capability can be employed so long as external means of delay time base capability is provided. This external means, for example, may take the form of controls and circuits similar to the controls 14 and 15 and their associated circuits. The external means would have to be synchronized with the index signal of the disc drive 11 and would have a time marker output signal fed into a different channel (for example, channel B) of the oscilloscope. Another output of this external means would correspond to the delay time trigger output of oscilloscope 12 and would be coupled via a switching function to the write gate input of the disc drive.

In a variation of the method embodying this invention, an entire group of alignment discs can be standardized relative to one another. This is accomplished by arbitrarily selecting one alignment disc of the group as a standard or reference disc. The timing band location as defined by the aforementioned formula are determined for this arbitrarily selected standard disc. These timing band locations for the standard disc are then used to write the timing bands on all of the other alignment discs in the group.

What is claimed is:

1. A method of preparing an alignment disc pak in which first and second signals of different frequencies ($f1$ and $f2$) are recorded in eccentric bands at a selected track on the disc such that when the recorded signals are played back, the playback signal consists of three components having frequencies $f1$, $f2$ and ($f1-f2$); said method comprising the steps of:

displaying a frame of the playback signal with one beam of a multibeam oscilloscope on the display surface thereof, where a frame is equal in time to the time of a single revolution of the disc, so that the ($f1-f2$) signal component appears as a "cat's eye" pattern having two outer crossovers and an intermediate crossover;

producing on the display surface with another of the oscilloscope beams a time marker;

measuring the distance Sp between the intermediate crossover and one of the outer crossovers;

positioning said time marker to first one and then the other of two positions on either side of the intermediate crossover, the two positions being defined by the formula (Gc − Sp ± 0.2/2) where Gc is the geometric center of the displayed frame of the playback signal;

producing first and second narrow timing bands on either side of the intermediate crossover by erasing the recorded signals only in radial sectors of the disc corresponding in position to the two positions of the time marker and to the width of such marker.

2. The method as set forth in claim 1 in which the producing step is further characterized by the following steps for each said time marker position:

generating an erase pulse equal in width to the time marker and corresponding in time base position to the time marker position; and applying said erase pulse to the write input of the disc drive in order to erase the recorded signals only in the radial sector of the disc corresponding in position to the current position of the time marker and its width.

* * * * *